US012564933B2

(12) United States Patent
Liao

(10) Patent No.: US 12,564,933 B2
(45) Date of Patent: Mar. 3, 2026

(54) WRENCH STRUCTURE

(71) Applicant: Chia-Kuan Liao, Taichung (TW)

(72) Inventor: Chia-Kuan Liao, Taichung (TW)

( * ) Notice: Subject to any disclaimer, the term of this patent is extended or adjusted under 35 U.S.C. 154(b) by 347 days.

(21) Appl. No.: 18/346,909

(22) Filed: Jul. 5, 2023

(65) Prior Publication Data

US 2025/0010455 A1 Jan. 9, 2025

(51) Int. Cl.

| | |
|---|---|
| ***B25G 1/10*** | (2006.01) |
| ***B25B 13/04*** | (2006.01) |
| ***B25B 13/08*** | (2006.01) |

(52) U.S. Cl.

CPC .............. *B25G 1/105* (2013.01); *B25B 13/04* (2013.01); *B25B 13/08* (2013.01)

(58) Field of Classification Search

CPC ......... B25G 1/105; B25B 13/02; B25B 13/04; B25B 13/08; B25B 13/46; B25B 13/481; B25B 23/16

See application file for complete search history.

(56) References Cited

U.S. PATENT DOCUMENTS

| | | | | |
|---|---|---|---|---|
| 9,981,363 | B2 | 5/2018 | Liau | |
| 2018/0015609 | A1* | 1/2018 | Liau | B25B 13/04 |

* cited by examiner

*Primary Examiner* — Robert J Scruggs

(74) *Attorney, Agent, or Firm* — LANWAY IPR SERVICES; Chun-Ming Shih

(57) ABSTRACT

A wrench structure includes a wrench body provided with a handle. The handle has a top and a bottom each provided with two first faces and two first recessed portions. The handle has a center provided with a projection having two second faces protruding from the first faces. The handle is provided with eight ribs. Each of the first recessed portions is defined between two of the ribs. The handle has two sides each provided with two first side faces. The projection has two second side faces protruding from the first side faces. A first guide angle is provided between each of the first side faces and one of the second side faces. The handle has a first end provided with a first rotation portion and a second end provided with a second rotation portion.

6 Claims, 6 Drawing Sheets

WRENCH STRUCTURE

BACKGROUND OF THE INVENTION

Field of the Invention

The present invention relates to a hand tool and, more particularly, to a wrench structure.

Description of the Related Art

A conventional open wrench was disclosed in the applicant's U.S. Pat. No. 9,981,363, and comprises a handle 11 provided with a depression which reduces the whole weight of the open wrench and saves the cost of material. However, the depression reduces the torque of the open wrench so that when the handle 11 is easily broken at the middle of the depression when a force applied on the open wrench is too large during rotation of the handle 11. In addition, the handle 11 is easily bent at the middle of the depression.

A conventional wrench was disclosed in the applicant's U.S. Patent Publication No. 20180015609, and comprises a handle 11 provided with a first block 113. The first block 113 protrudes from the top and the bottom of the first face 111. The handle 11 has a first length 31. The maximum length of the first block 113 defines a second length 32. A proportion of the first length 31 and the second length 32 is ranged between four to one (4:1) and two to one (2:1). The handle 11 has a first thickness 33. The minimum thickness of the recess 112 defines a second thickness 34. The first block 113 has a third thickness 35. Thus, the first block 113 has the second length 32 and the third thickness 35 so that the first block 113 increases the maximum rotation torque of the handle 11. However, the handle 11 does not have any holding portion so that when the user holds the handle 11, the user's hand easily slips from the handle 11.

BRIEF SUMMARY OF THE INVENTION

In accordance with the present invention, there is provided a wrench structure comprising a wrench body. The wrench body is provided with a handle. The handle has a top and a bottom each provided with two first faces. Each of the top and the bottom of the handle is provided with two first recessed portions. The handle has a center provided with a projection. The projection has two second faces which are provided on a top and a bottom of the projection. The second faces protrude from the first faces. The handle is provided with eight ribs. Each of the first recessed portions is defined between two of the ribs. The handle has two sides each provided with two first side faces. The projection has two second side faces which are provided on two sides of the projection. The second side faces protrude from the first side faces. A first guide angle is provided between each of the first side faces and one of the second side faces. The handle has a first end provided with a first rotation portion. The handle has a second end provided with a second rotation portion.

According to the primary advantages of the present invention, each of the top and the bottom of the handle is provided with the two first recessed portions. The handle is provided with the projection. The projection is provided between the first recessed portions. The first thickness is more than the second thickness. The first recessed portions reduce the weight of the handle. The projection increases the rotation torque when the handle is rotated. Thus, the handle has a balance between the weight and the rotation torque. The handle is provided with eight ribs. Any two of the ribs are arranged on two sides of each of the first recessed portions. The ribs have a rotation torque. Thus, the handle has a rotation toughness by provision of the first recessed portions and the ribs so that the handle is not broken easily. The handle has a reduced weight by provision of the first recessed portions, increases the rotation torque by provision of the projection, and has a rotation toughness by provision of the first recessed portions and the ribs.

BRIEF DESCRIPTION OF THE SEVERAL VIEWS OF THE DRAWING(S)

DETAILED DESCRIPTION OF THE INVENTION

Figure 1:
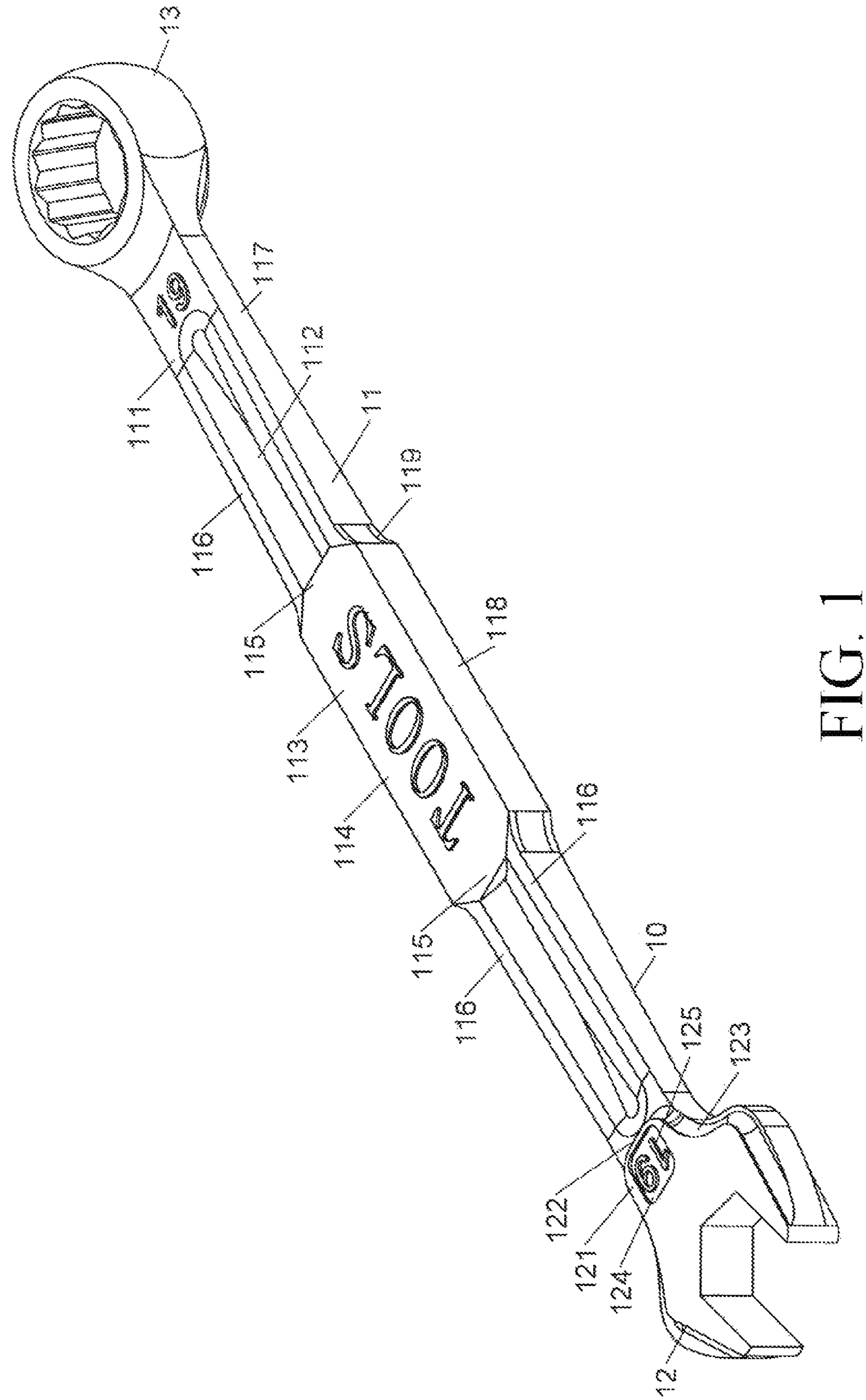
FIG. 1 is a perspective view of a wrench structure in accordance with the first preferred embodiment of the present invention.
Figure 2:
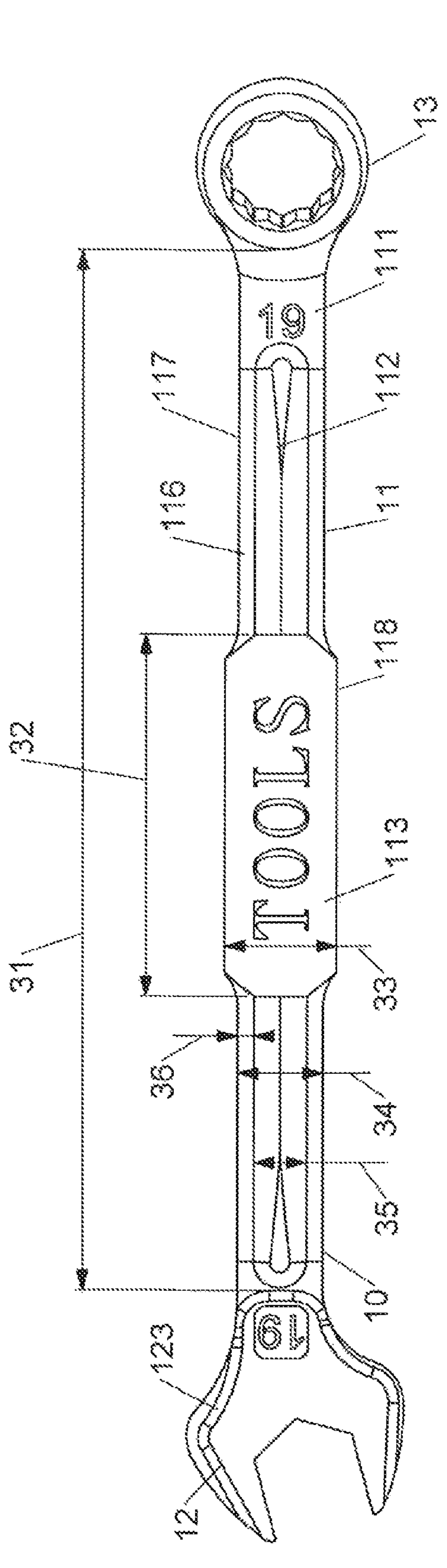
FIG. 2 is a top view of the wrench structure as shown in FIG. 1.
Figure 3:
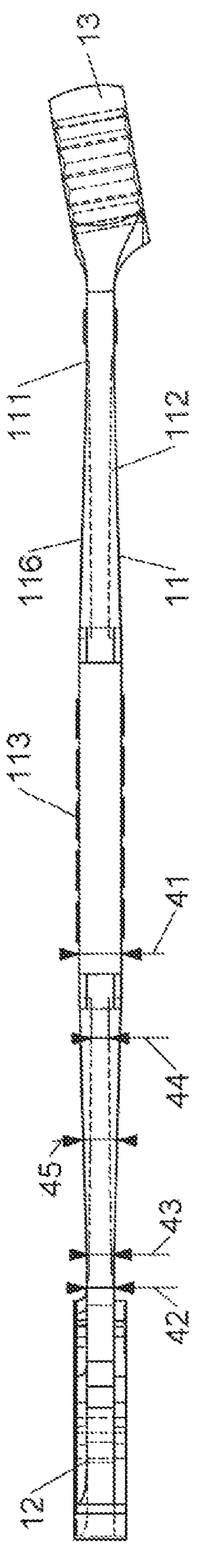
FIG. 3 is a side view of the wrench structure as shown in FIG. 1.

Referring to the drawings and initially to FIGS. 1-3, a wrench structure in accordance with the preferred embodiment of the present invention comprises a wrench body 10. The wrench body 10 is provided with a handle 11. The handle 11 has a top and a bottom each provided with two first faces 111. Each of the first faces 111 has a planar shape. Each of the top and the bottom of the handle 11 is provided with two first recessed portions 112. Each of the first recessed portions 112 is a groove. The handle 11 has a center provided with a projection 113. The projection 113 has a rectangular shape. The projection 113 has two second faces 114 which are provided on a top and a bottom of the projection 113. Each of the second faces 114 has a planar shape. The second faces 114 protrude from the first faces 111. The projection 113 has two ends each provided with a first corner 115. The first corner 115 has a trapezium shape. The two ends of the projection 113 are connected to the first recessed portions 112. The projection 113 is provided between the first recessed portions 112. The first recessed portions 112 are arranged symmetrically relative to the projection 113.

The handle 11 is provided with eight ribs 116. The eight ribs 116 are arranged symmetrically relative to the projection 113. Each of the first recessed portions 112 is defined between two of the ribs 116. The two of the ribs 116 are arranged symmetrically relative to each of the first recessed portions 112. Each of the ribs 116 has a first end connecting one of the first faces 111 and a second end connecting one of the second faces 114. Each of the ribs 116 has a thickness increased gradually from one of the first faces 111 toward one of the second faces 114. Each of the ribs 116 has different horizontal planes.

The handle 11 has two sides each provided with two first side faces 117. The first side faces 117 are perpendicular to the first faces 111. The projection 113 has two second side faces 118 which are provided on two sides of the projection 113. The second side faces 118 protrude from the first side faces 117. The second side faces 118 are perpendicular to the second faces 114. A first guide angle (or corner) 119 is provided between each of the first side faces 117 and one of the second side faces 118. The first guide angle 119 has an arcuate concave shape or an oblique shape.

The handle 11 has a first end provided with a first rotation portion 12. The first rotation portion 12 is an open end. The first rotation portion 12 is provided with two third faces 121. Each of the third faces 121 has a height more than that of one of the first faces 111. A second corner 122 is provided on a connection of the first rotation portion 12 and the handle 11. A second guide angle (or corner) 123 is provided between each of the third faces 121 and the handle 11. The second guide angle 123 has a chamfered shape or an oblique shape. Each of the third faces 121 is provided with a depression 124 close to the handle 11. The depression 124 has a horizontal height less than that of one of the third faces 121. The depression 124 is provided with a protruding second indication (or marking) 125. The second indication 125 is a trademark or a specification or a size of the wrench structure.

The handle 11 has a second end provided with a second rotation portion 13. The second rotation portion 13 is a box end.

The handle 11 has a first length 31. The projection 113 has a second length 32. The first length 31 is more than the second length 32. The first length 31 is 2.5 times to seven (7) times of the second length 32. Alternatively, the first length 31 is three (3) times to 5.5 times of the second length 32.

The projection 113 has a first width 33. The handle 11 has a second width 34. Each of the first recessed portions 112 has a third width 35. Each of the ribs 116 has a fourth width 36. The first width 33 is more than the second width 34. The second width 34 is more than the third width 35. The third width 35 is more than the fourth width 36. The first width 33 is 1.2 times to 1.5 times of the second width 34. Alternatively, the first width 33 is 1.3 times to 1.4 times of the second width 34. The second width 34 is 1.5 times to 1.8 times of the third width 35. The third width 35 is 2.5 times to four (4) times of the fourth width 36. Alternatively, the third width 35 is three (3) times to 3.5 times of the fourth width 36.

A first thickness 41 is defined between the second faces 114. A second thickness 42 is defined between the first faces 111. The shallowest position of each of the first recessed portions 112 has a third thickness 43. The third thickness 43 is close to the first rotation portion 12 or the second rotation portion 13. The deepest position of each of the first recessed portions 112 has a fourth thickness 44. The fourth thickness 44 is close to the projection 113. The first thickness 41 is more than the second thickness 42. The second thickness 42 is more than the third thickness 43. The third thickness 43 is more than the fourth thickness 44. The first thickness 41 is 1.3 times to 1.7 times of the second thickness 42. Alternatively, the first thickness 41 is 1.4 times to 1.6 times of the second thickness 42.

Each of the ribs 116 has an angle 45. The angle 45 is less than five degrees (5°).

Figure 4:
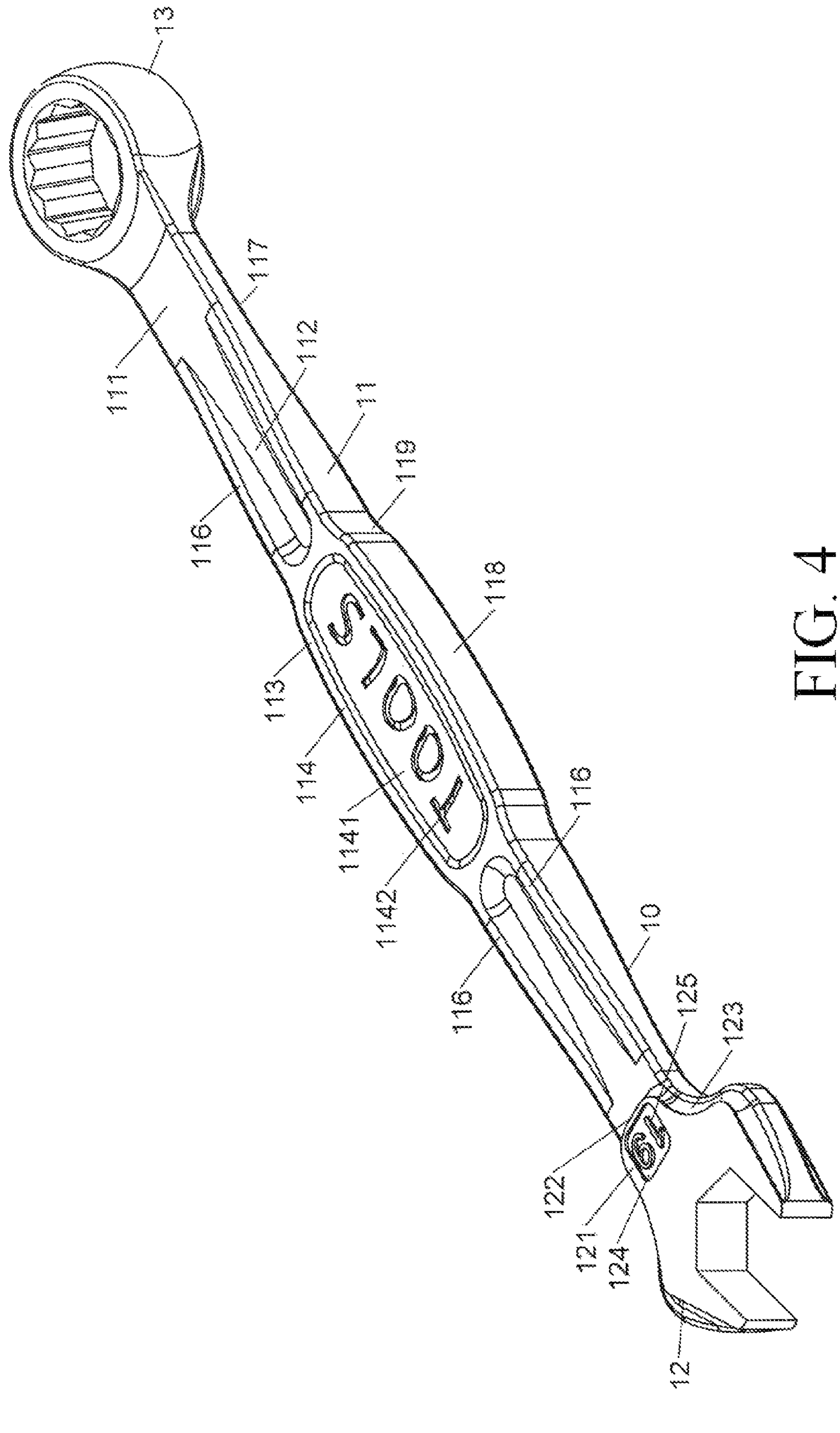
FIG. 4 is a perspective view of a wrench structure in accordance with the second preferred embodiment of the present invention.
Figure 5:
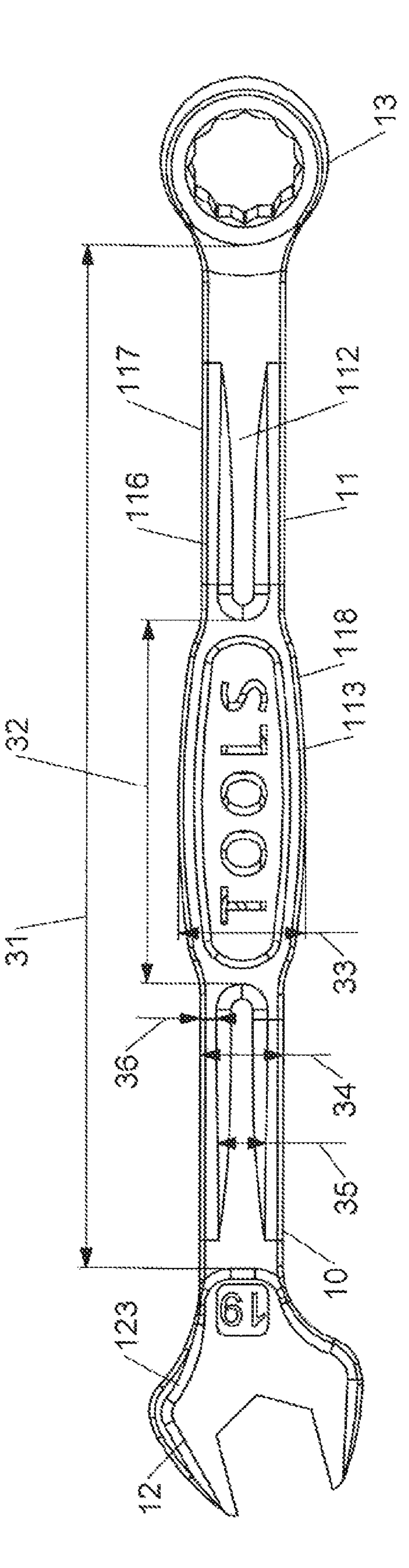
FIG. 5 is a top view of the wrench structure as shown in FIG. 4.
Figure 6:
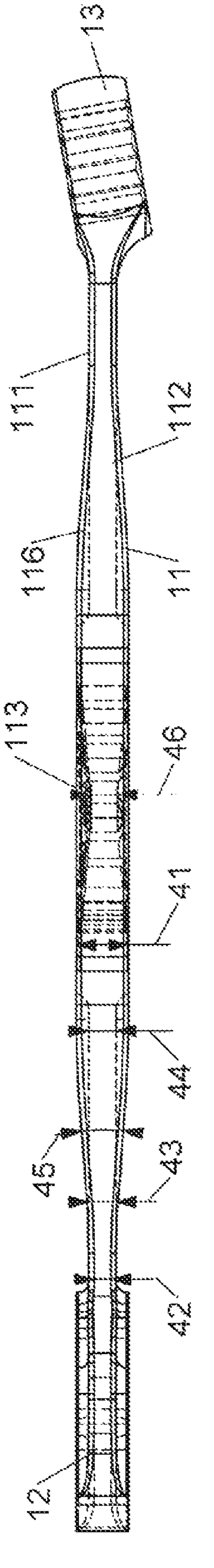
FIG. 6 is a side view of the wrench structure as shown in FIG. 4.

Referring to FIGS. 4-6, each of the second faces 114 is provided with a second recessed portion 1141. The second recessed portion 1141 has an area less than that of each of the second faces 114. The second recessed portion 1141 has an arcuate concave shape. The second recessed portion 1141 is provided with a first indication (or marking) 1142. The first indication 1142 is a groove. The first indication 1142 is a trademark or a specification or a size of the wrench structure. A fifth thickness 46 is defined between the second recessed portions 1141 of the second faces 114 of the projection 113. The fifth thickness 46 is less than the first thickness 41.

Figure 7:
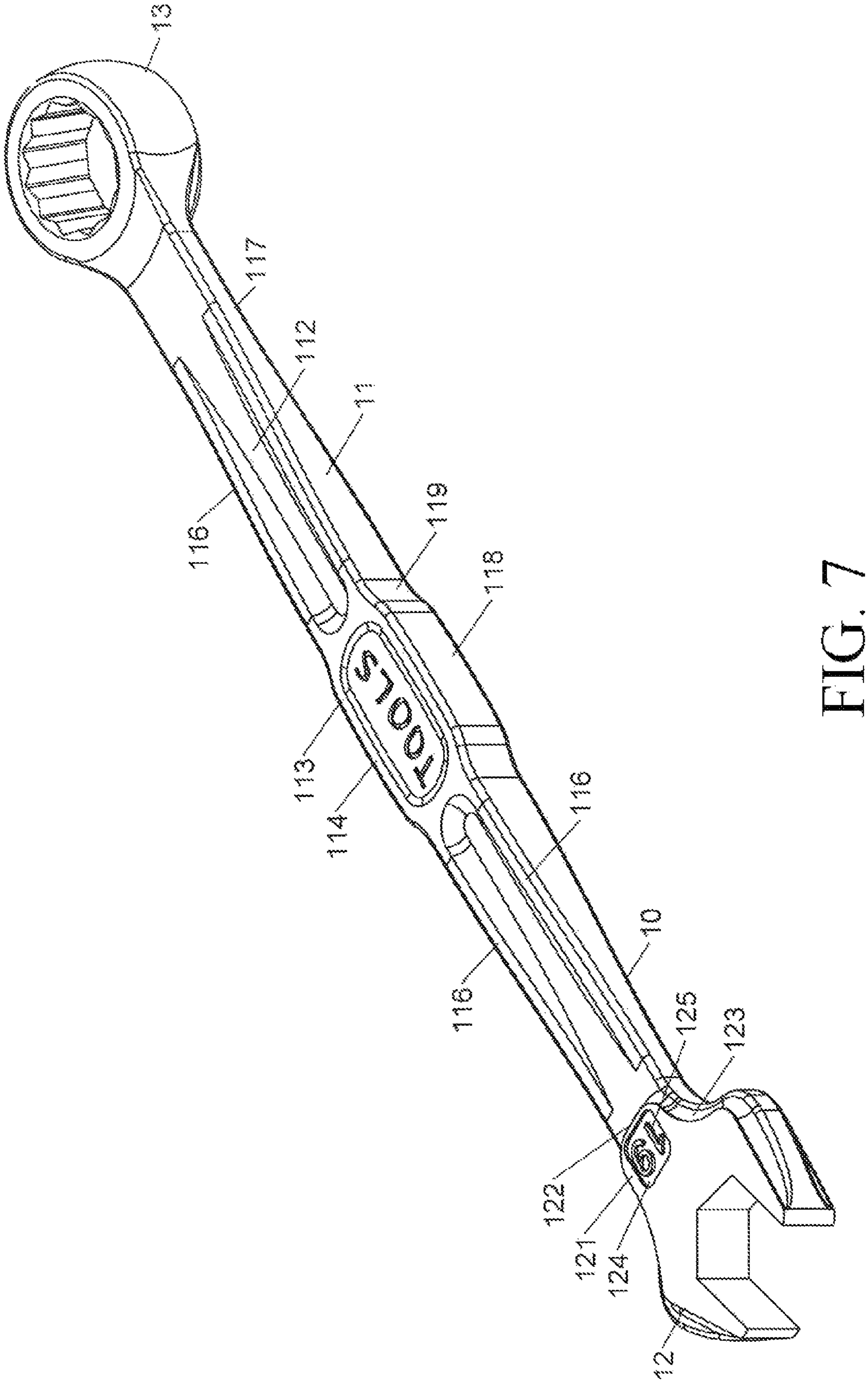
FIG. 7 is a perspective view of a wrench structure in accordance with the third preferred embodiment of the present invention.
Figure 8:
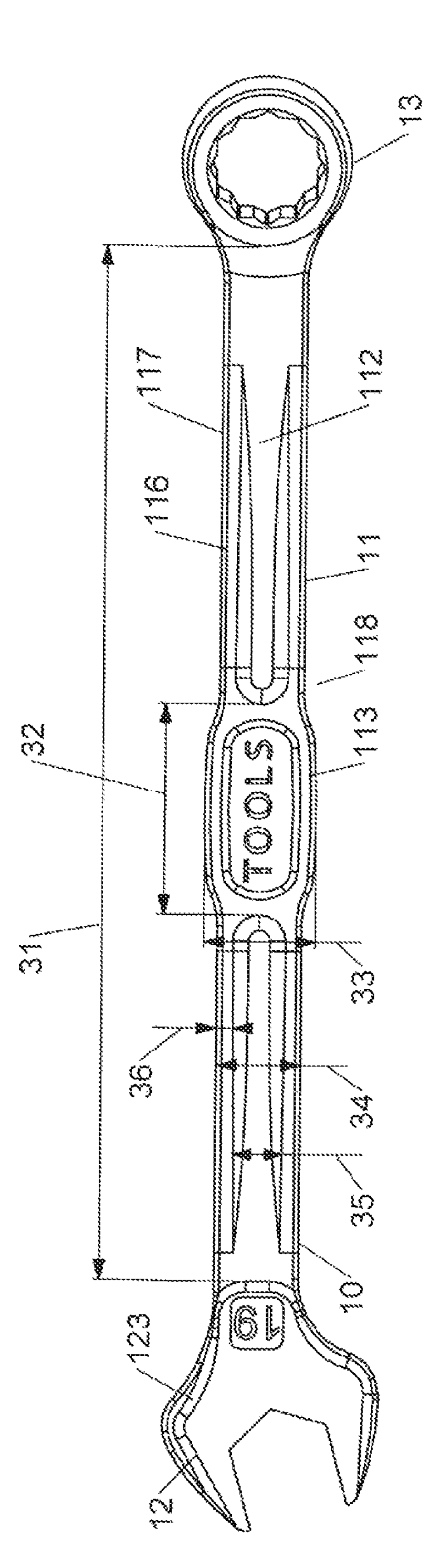
FIG. 8 is a top view of the wrench structure as shown in FIG. 7.
Figure 9:
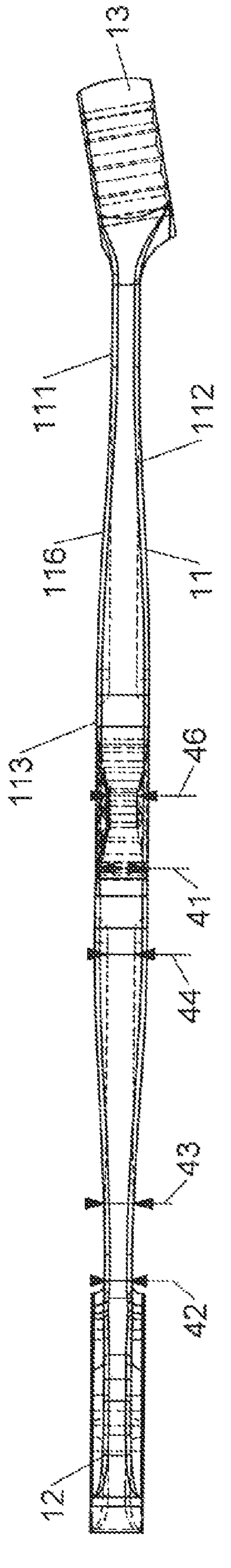
FIG. 9 is a side view of the wrench structure as shown in FIG. 7.

Referring to FIGS. 7-9, the second length 32 is decreased, and the length of each of the first recessed portions 112 is increased. The first length 31 and the second length 32 have different proportions.

Accordingly, the wrench structure of the present invention has the following advantages.

1. Each of the top and the bottom of the handle 11 is provided with the two first recessed portions 112. The handle 11 is provided with the projection 113. The projection 113 is provided between the first recessed portions 112. The first thickness 41 is more than the second thickness 42. The first recessed portions 112 reduce the weight of the handle 11. The projection 113 increases the rotation torque when the handle 11 is rotated. Thus, the handle 11 has a balance between the weight and the rotation torque.
2. The handle 11 is provided with eight ribs 116. Any two of the ribs 116 are arranged on two sides of each of the first recessed portions 112. The ribs 116 have a rotation torque. Thus, the handle 11 has a rotation toughness by provision of the first recessed portions 112 and the ribs 116 so that the handle 11 is not broken easily.
3. The handle 11 has a reduced weight by provision of the first recessed portions 112, increases the rotation torque by provision of the projection 113, and has a rotation toughness by provision of the first recessed portions 112 and the ribs 116. Thus, the wrench structure has three structural benefits.
4. When the wrench body 10 is driven, the user's thumb rests on the first guide angle 119 which facilitates the user operating and rotating the handle 11.
5. The first thickness 41 of the projection 113 is more than the second thickness 42 of the handle 11 so that the user's thumb holds the projection 113 to operate and rotate the handle 11 easily.
6. When the user holds the handle 11, the user's thumb presses the first guide angle 119 or the connection of each of the first recessed portions 112 and the projection 113, so that the handle 11 is driven and rotated easily and conveniently.
7. When the user holds the handle 11, the user's thumb abuts the projection 113, the connection of each of the first recessed portions 112 and the projection 113 or the first guide angle 119 according to the practical requirement.
8. The handle 11 is provided with the first faces 111, the first recessed portions 112, the projection 113, and the ribs 116. The handle 11 also has the first thickness 41, the second thickness 42, the third thickness 43, the fourth thickness 44, and the angle 45. In such a manner, the handle 11 has different thickness and a determined angle. Thus, the handle 11 has a three-dimensional appearance by provision of different thickness and the angle 45, thereby enhancing the aesthetic quality of the wrench structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wrench structure comprising:

a wrench body;

wherein:

the wrench body is provided with a handle;

the handle has a top and a bottom each provided with two first faces;

each of the first faces has a planar shape;

each of the top and the bottom of the handle is provided with two first recessed portions;

each of the first recessed portions is a groove;

the handle has a center provided with a projection;

the projection has a rectangular shape;

the projection has two second faces which are provided on a top and a bottom of the projection;

each of the second faces has a planar shape;

the second faces protrude from the first faces;

the projection has two ends each provided with a first corner;

the two ends of the projection are connected to the first recessed portions;

the projection is provided between the first recessed portions;

the first recessed portions are arranged symmetrically relative to the projection;

the handle is provided with eight ribs;

the eight ribs are arranged symmetrically relative to the projection;

each of the first recessed portions is defined between two of the ribs;

the two of the ribs are arranged symmetrically relative to each of the first recessed portions;

each of the ribs has a first end connecting one of the first faces and a second end connecting one of the second faces;

each of the ribs has a thickness increased gradually from one of the first faces toward one of the second faces;

the handle has two sides each provided with two first side faces;

the projection has two second side faces which are provided on two sides of the projection;

the second side faces protrude from the first side faces;

a first guide angle is provided between each of the first side faces and one of the second side faces;

the handle has a first end provided with a first rotation portion;

the handle has a second end provided with a second rotation portion;

the handle has a first length;

the projection has a second length;

the first length is more than the second length;

the first length is 2.5 times to seven times of the second length;

the first length is three times to 5.5 times of the second length;

the projection has a first width;

the handle has a second width;

each of the first recessed portions has a third width;

each of the ribs has a fourth width;

the first width is more than the second width;

the second width is more than the third width;

the third width is more than the fourth width;

the first width is 1.2 times to 1.5 times of the second width;

the first width is 1.3 times to 1.4 times of the second width;

the second width is 1.5 times to 1.8 times of the third width;

the third width is 2.5 times to four times of the fourth width;

the third width is three times to 3.5 times of the fourth width;

a first thickness is defined between the second faces;

a second thickness is defined between the first faces;

a shallowest position of each of the first recessed portions has a third thickness;

the third thickness is close to the first rotation portion or the second rotation portion;

a deepest position of each of the first recessed portions has a fourth thickness;

the fourth thickness is close to the projection;

the first thickness is more than the second thickness;

the second thickness is more than the third thickness;

the third thickness is more than the fourth thickness;

the first thickness is 1.3 times to 1.7 times of the second thickness;

the first thickness is 1.4 times to 1.6 times of the second thickness;

each of the ribs has an angle; and the angle is less than five degrees.

2. The wrench structure as claimed in claim 1, wherein the first corner has a trapezium shape.

3. The wrench structure as claimed in claim 1, wherein the first side faces are perpendicular to the first faces, the second side faces are perpendicular to the second faces, and the first guide angle has an arcuate concave shape or an oblique shape.

4. The wrench structure as claimed in claim 1, wherein:

the first rotation portion is an open end;

the first rotation portion is provided with two third faces;

each of the third faces has a height more than that of one of the first faces;

a second corner is provided on a connection of the first rotation portion and the handle;

a second guide angle is provided between each of the third faces and the handle;

the second guide angle has a chamfered shape or an oblique shape;

each of the third faces is provided with a depression close to the handle;

the depression has a horizontal height less than that of one of the third faces;

the depression is provided with a protruding second indication; and the second indication is a trademark or a specification or a size of the wrench structure.

5. The wrench structure as claimed in claim 1, wherein the second rotation portion is a box end.

6. The wrench structure as claimed in claim 1, wherein:

each of the second faces is provided with a second recessed portion;

the second recessed portion has an area less than that of each of the second faces;

the second recessed portion has an arcuate concave shape;

the second recessed portion is provided with a first indication;

the first indication is a groove;

the first indication is a trademark or a specification or a size of the wrench structure;

a fifth thickness is defined between the second recessed portions of the second faces of the projection; and the fifth thickness is less than the first thickness.

* * * * *